United States Patent [19]
Lindstedt

[11] Patent Number: 5,205,680
[45] Date of Patent: Apr. 27, 1993

[54] METAL CUTTING INSERT WITH ROUNDED CUTTING EDGE

[75] Inventor: Lars Lindstedt, Sandviken, Sweden
[73] Assignee: Sandvik AB, Sweden
[21] Appl. No.: 726,401
[22] Filed: Jul. 5, 1991
[30] Foreign Application Priority Data
 Jul. 19, 1990 [SE] Sweden ............................ 9002464
[51] Int. Cl.$^5$ ............................................. B23B 27/22
[52] U.S. Cl. ..................................... 407/116; 407/117
[58] Field of Search ................................ 407/114–117
[56] References Cited
U.S. PATENT DOCUMENTS 3,395,434  8/1968  Wirfezt .............................. 407/114
3,733,664  5/1973  McKelvey .......................... 407/114
4,844,668  7/1989  Pettersson ......................... 407/117

Primary Examiner—Steven C. Bishop
Attorney, Agent, or Firm—Burns, Doane, Swecker & Mathis

[57] ABSTRACT

An insert for metal turning and grooving has an annular cutting edge. A chipformer surface is disposed radially inside of the cutting edge. A chip breaking wall is disposed radially inside of the chipformer surface. The chip breaking wall is inclined upwardly. A first section of the chip breaking wall located adjacent a front end of the insert has a steeper inclination than a second section thereof spaced circumferentially from the first section in a direction toward the rear end of the insert. The inclination of the chip breaking wall varies progressively from the first section to the second section.

7 Claims, 3 Drawing Sheets

METAL CUTTING INSERT WITH ROUNDED CUTTING EDGE

BACKGROUND OF THE INVENTION

The present invention relates to a metal cutting insert for profile turning and grooving. Such inserts are known which comprise longitudinally extending top and bottom surfaces, a forward end of the insert being provided with a cutting edge of circular shape which intersects rearwardly extending side edges of the insert. The top surface is provided with a chip forming surface located radially inside the cutting edge. The insert cuts a workpiece as the latter rotates about an axis, and the insert is displaced in a direction parallel to that axis.

There occurs a problem when using such rounded inserts for longitudinal turning, because chips of varying thickness are obtained along the cutting depth. At the radially innermost point (i.e., radially with respect to the axis of rotation of the workpiece), where the chip thickness is smallest, it is desirable to have a rear chip breaking wall so designed that a more favorable chip formation is achieved. On the other hand, the chip breaking wall should be different to achieve optimum breaking of thicker chips occurring at the outer periphery of the workpiece.

One object of the present invention is to provide an insert which performs plurality of turning and grooving operations while maintaining good chip control regardless of the chip thickness.

BRIEF DESCRIPTION OF THE INVENTION

This and other objects are achieves by forming the insert such that the rear chip breaking wall is formed with a varying inclination, more specifically with such variance that a first section of that wall located adjacent a front end of the insert has a steeper inclination than a second section spaced circumferentially from the first section in a direction toward a rear end of the insert. Preferably, the inclination varies continuously from the first section to the second section.

BRIEF DESCRIPTION OF THE DRAWINGS

The objects and advantages of the invention will become apparent from the following detailed description of preferred embodiments thereof in connection with the accompanying drawings in which like numerals designate like elements, and in which.

DETAILED DESCRIPTION OF PREFERRED EMBODIMENTS OF THE INVENTION

Figure 1:
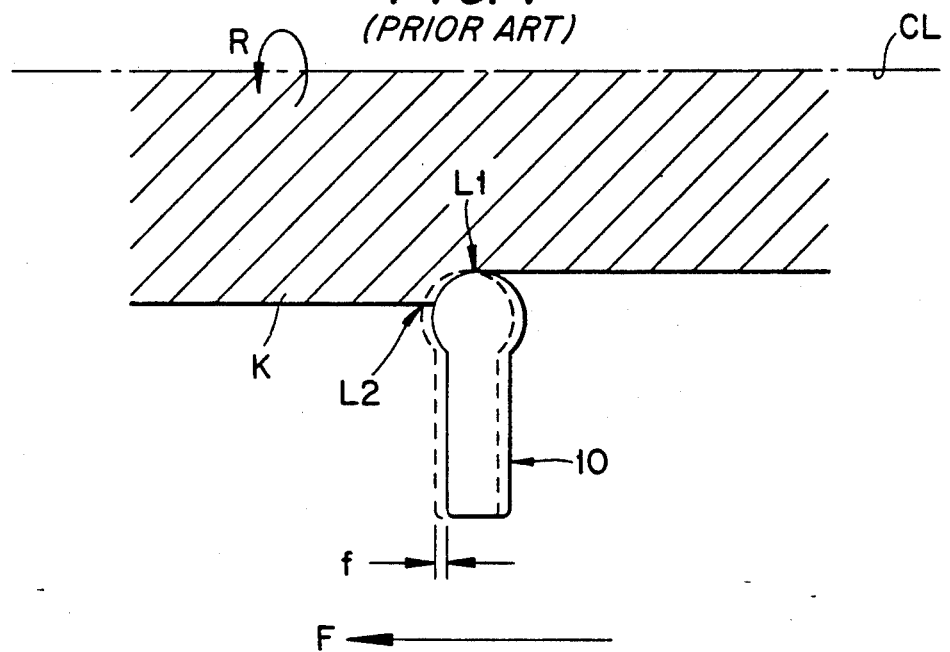
FIG. 1 is a plan view of a conventional longitudinal turning operation using an insert with a circularly shaped cutting edge.

In FIG. 1, there is depicted a principal view of a longitudinal turning operation in which an insert 10 is fed in an axial direction F with a feed rate f mm/r (i.e., mm per each complete rotation of the workpiece) relative to a workpiece K that is rotated in direction R, the center line and axis of rotation of the workpiece is designated CL. As appears from the double-hatched region of this figure, the thickness of the chip is smallest at the radially innermost cutting location L1 (i.e., radially with respect to the axis CL), and gradually increases towards the radially outermost periphery L2 of the workpiece.

An insert 10 according to the present invention is shown in FIGS. 2-6. It comprises two mainly parallel, planar side surfaces 11, 12, two lower and upper edge surfaces 13, 14, two rear and front end surfaces 15, 16, an upper shoulder 17 and an upper front portion 18 which is provided with a circular cutting edge 19 and a chipformer surface 20. The lower and upper edge surfaces 13, 14 extend in a front-to-rear direction D of the insert. The shoulder 17 divides the upper front portion 18 from the upper edge surface 14 and defines therewith a top face of the insert. The cutting edge 19 intersects two rear side edges 21, 22 located in the same plane as side surfaces 11, 12, respectively. The insert 10 shall be secured to a holder body by means of a clamping arm (not shown) acting against the upper edge surface 14 of the insert. The insert is clamped in a working position by the resilient force with which the clamping arm influences on the insert as disclosed in Pettersson et al U.S. Pat. No. 4,801,224 which is incorporated herein by reference.

Figure 2:
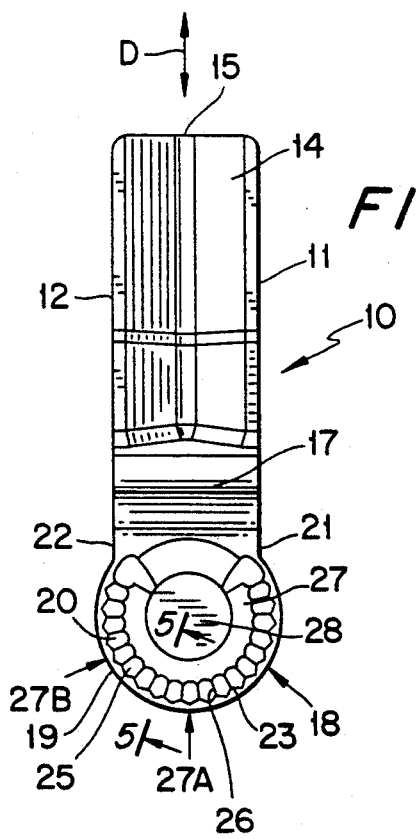
FIG. 2 is a top view of an insert according to the present invention.
Figure 3:
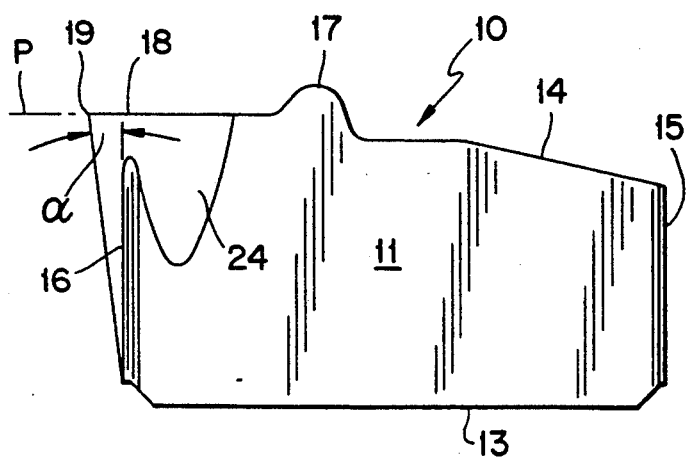
FIG. 3 is a side view of the insert of FIG. 2.
Figure 4:
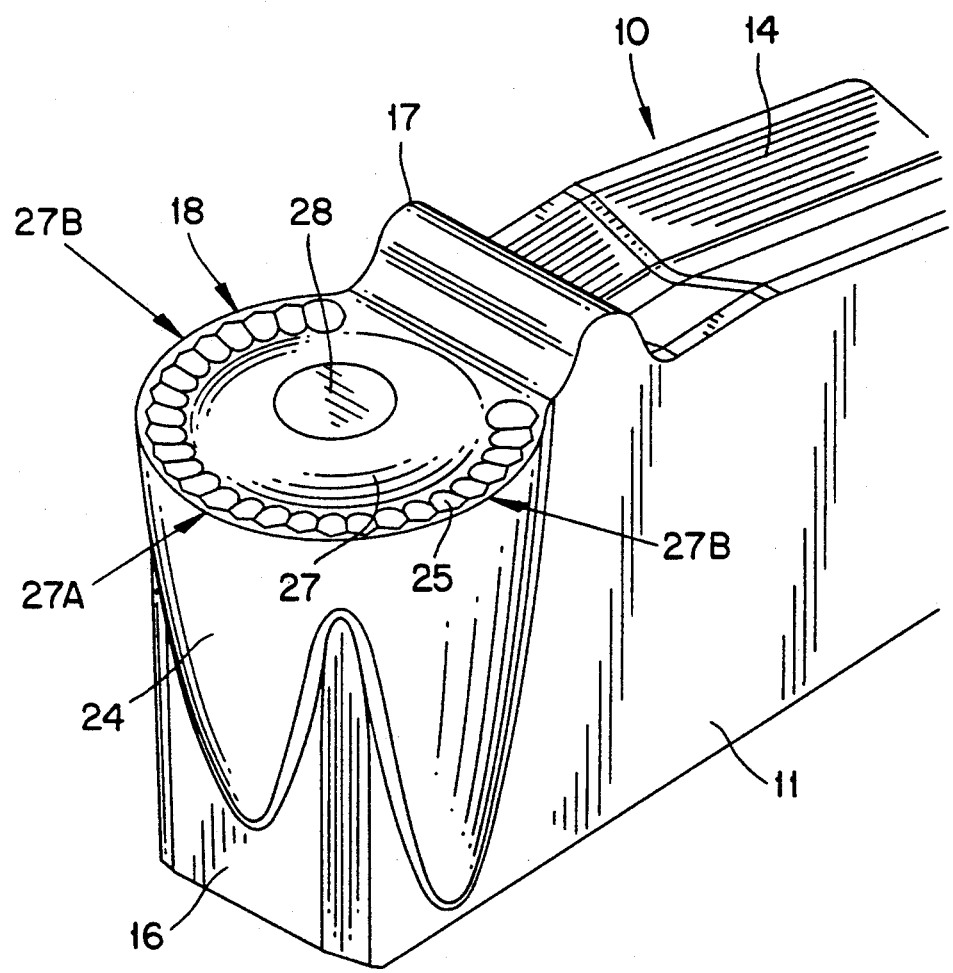
FIG. 4 is an enlarged front perspective view of the insert shown in FIGS. 2 and 3.
Figure 5:
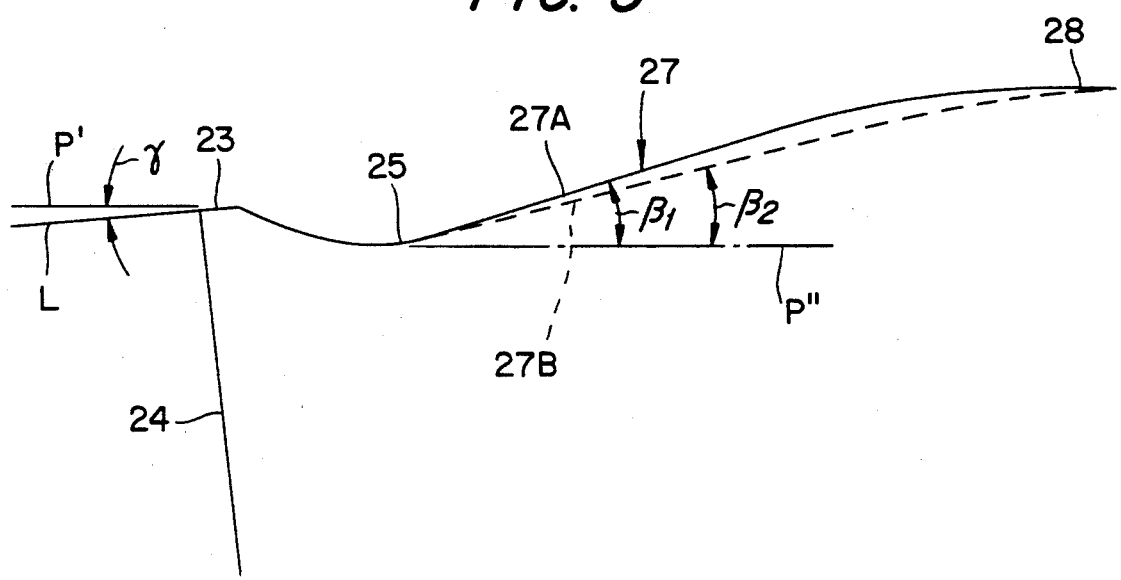
FIG. 5 is a sectional view taken along the line 5—5 in FIG. 2.

A planar reinforcement land 23 is located radially inside of the cutting edge 19. The clearance face 24 intersects that land 23 to form the cutting edge, the latter being circular as the insert is viewed in plan (FIG. 2). The clearance face 24 intersects the front end surface 16 at an acute angle $\alpha$ in the range of from 0.1 to 15 degrees. The land 23 is located in a plane L, which forms an angle $\gamma$ in the range of from 1 to 6 degrees with the neutral plane P', i.e., a "neutral plane" being defined herein as a plane which lies parallel to the lower edge surface 13. The radial extent of the land 23 is limited by the chipformer 20 which comprises a number of circumferentially adjacent recesses 25 of toroidal shape, elliptical shape or any other suitable shape, intended to give the insert a positive chip angle of from 5 to 30 degrees, and intended to plastically deform the chip such that it can be more easily to broken. Generally radially extending ridges 26 are located between the recesses, i.e., are defined by the intersection of the recesses, for the purpose of supporting the land 23. The ridges 26 extend generally radially. A chip breaking wall 27 is provided behind or radially inside of the chipformer surface 20 which extends upwards to a central portion 8 located above or even with the cutting edge 19.

The rear wall 27 is provided with varying inclination around its circumference. More specifically, the slope of the rear wall 27 is provided with a continuously varying inclination such that a wall section 27A (FIG. 2) located at a longitudinally forward location on the upper front portion 18 (i.e., at a radially inner cutting location with respect to the workpiece so as to be closest to the center of the workpiece), has a steeper inclination, i.e., a larger inclination angle $\beta_1$, in relation to a neutral plane P'', than a section 27B of the wall 27 that is located at a circumferentially rearwardly spaced location relative to the section 27A. Thus, the less steep inclination $\beta_2$ of the section 27B is located at a radially outer cutting location with respect to the workpiece. The locations 27A and 27B are circumferentially spaced apart by no more than 90 degrees. As appears from FIG. 5, the above-mentioned rear chip breaking wall 27 can, for its major extent, be in the shape of a straight inclined wall where $\beta_1$ represents the inclination angle through section 27A, and $\beta_2$ represents the inclination angle for section 27B. Clearly angle $\beta_1$ is larger than angle $\beta_2$. For an insert having a cutting edge 19 with a diameter of from 3 to 5 mm, the inclination angles $\beta 1$, $\beta_2$ could lie in the range of from 17° to 22°.

Figure 6:
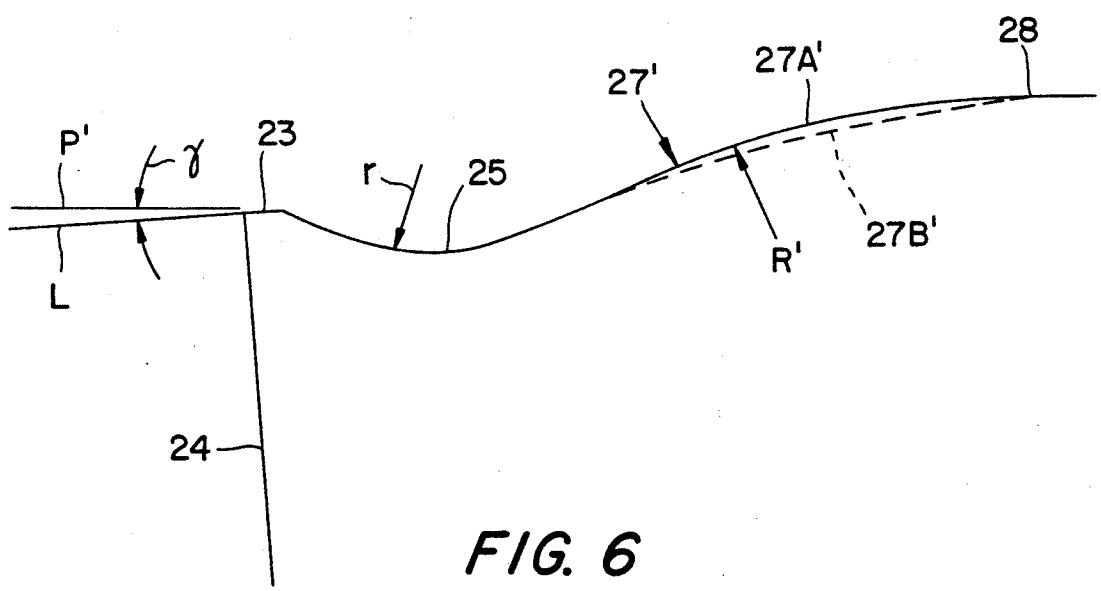
FIG. 6 is a sectional view similar to FIG. 5 of an alternative embodiment of the invention.

Instead of being substantially straight, the rear chip breaking wall 27' could be in the shape of a convexly curved wall as shown in FIG. 6, with a curvature R' substantially larger than the curvature r of the recesses 25. The curvature of section 27A' located at the front of the insert is greater than the curvature of section 27B' located at a circumferentially rearwardly spaced location. Alternatively, the chip breaking wall could be of concave curvature, again with a curvature which forms a steeper inclination at the front of the insert than at the circumferentially rearwardly spaced location.

It is understood that the invention is also useful with insert embodiments that have no reinforcement land 23, as well as with inserts in which the chipformer surface is in the shape of a single elongated recess that extends along the entire cutting edge 19.

Although the invention has been described in connection with preferred embodiments thereof, it will be appreciated by those skilled in the art that additions, modifications, substitutions, and deletions may be made without departing from the spirit and scope of the invention as defined in the appended claims.

What is claimed is:

1. A cutting insert for turning and grooving tools, comprising:
    upper and lower front-to-rear extending surfaces,
    two oppositely disposed side surfaces interconnecting said upper and lower front-to-rear extending surfaces, and
    front and rear end surfaces each intersecting said upper and lower front-to-rear extending surfaces and said side surfaces,
    a front portion of said upper front-to-rear extending surface including
        a generally annularly extending cutting edge for cutting a chip having a varying thickness along the cut depth, wherein the chip has a smaller thickness adjacent a forward end of said front portion than adjacent a location spaced circumferentially from said forward end in a direction toward said rear end surface,
        a chipforming surface disposed radially inside of said cutting edge, and
        a chip breaking rear wall disposed radially inside of said chipforming surface, and extending upwardly therefrom,
    a first section of said rear wall disposed adjacent said forward end of said front portion having a steeper upward inclination than a second section of said rear wall, disposed adjacent said location so that said first section acts on a smaller chip thickness than does said second section.

2. A cutting insert according to claim 1, wherein said second section is spaced circumferentially from said first section by no more than ninety degrees.

3. A cutting insert according to claim 1, wherein said upward inclinations of said first and second sections lie in a range of from seventeen to twenty-two degrees.

4. A cutting insert according to claim 1, wherein said rear wall has a substantially straight contour as viewed in a radial cross section through said front portion.

5. A cutting insert according to claim 1, wherein said chipforming surface is of concave shape as viewed in a radial cross section; said rear wall having a convexly curved contour as viewed in said radial plane and having a larger radius than said chipforming surface.

6. A cutting insert according to claim 1, wherein said chipforming surface comprises a plurality of circumferentially adjacent recesses intersecting one another to form generally radially extending ridges.

7. A cutting insert according to claim 1, wherein the inclination of said rear wall varies continuously from said first section to said second section.

* * * * *